United States Patent
Kojima et al.

(10) Patent No.: US 8,284,500 B2
(45) Date of Patent: Oct. 9, 2012

(54) LASER LINE-GENERATOR AND LASER LINE-GENERATOR MODULE

(75) Inventors: Chiaki Kojima, Yokohama (JP); Ja Koo, Yokohama (JP); Hiroyuki Imai, Yokohama (JP)

(73) Assignee: Ayase Co., Ltd. (JP)

( * ) Notice: Subject to any disclaimer, the term of this patent is extended or adjusted under 35 U.S.C. 154(b) by 703 days.

(21) Appl. No.: 12/480,006

(22) Filed: Jun. 8, 2009

(65) Prior Publication Data

US 2010/0309565 A1    Dec. 9, 2010

(51) Int. Cl.
*G02B 13/18* (2006.01)

(52) U.S. Cl. .................................. 359/708; 359/719

(58) Field of Classification Search .................. 359/708, 359/709, 718, 719
See application file for complete search history.

(56) References Cited

U.S. PATENT DOCUMENTS 6,069,748 A * 5/2000 Bietry ............................ 359/719
7,821,718 B1 * 10/2010 Govyadinov et al. ......... 359/624

FOREIGN PATENT DOCUMENTS

JP    2003-329454    11/2003
JP    2003329454 A * 11/2003

* cited by examiner

*Primary Examiner* — Scott J Sugarman
(74) *Attorney, Agent, or Firm* — Charles S. Guenzer (57) ABSTRACT

An object of the invention is to provide a laser line-generator that generates a straight line with the both end portions as bright as the central portion, and a laser line-generator module that integrates the laser line-generator with a laser light source. A columnar transparent medium has an entrance boundary surface 10 for taking in laser light and an exit surface 20 for emitting the taken laser light linearly. At least one of the entrance boundary surface 10 and the exit surface 20 is composed of a curved surface, and a curve forming the curved surface includes two or more inflection points F.

17 Claims, 7 Drawing Sheets

LASER LINE-GENERATOR AND LASER LINE-GENERATOR MODULE

BACKGROUND OF THE INVENTION

1. Field of the Invention

The present invention relates to an optical component used for a laser marker and the like. The present invention specifically relates to a laser line-generator that converts a point light source of laser light to a line light source, and a laser line-generator module that integrates the laser-line generator with a laser light source.

2. Description of the Related Art

Figure 10:
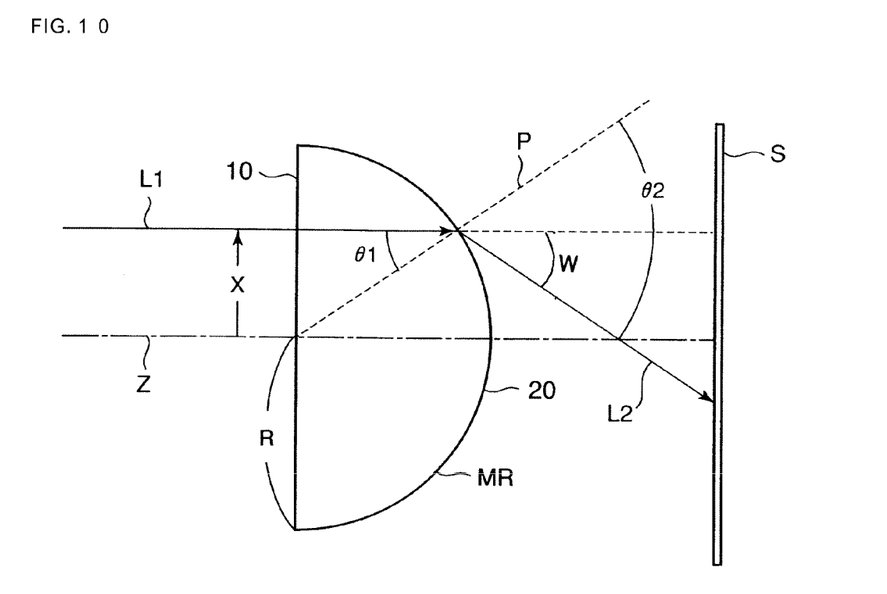
FIG. 10 is a principle diagram of a laser line-generator using a semi-cylindrical rod lens.

A straight line generated by a laser line-generator using a conventional cylindrical lens has a characteristic that the both end portions are darker than the bright central portion. Therefore, in a reference setting operation of providing a long reference line, the both ends are difficult to see, which causes a decrease in workability. FIG. 10 is a principle diagram of a laser-line generator using a semi-cylindrical rod lens. A semi-cylindrical rod lens MR having a radius R is set with an optical axis Z as a central axis, and a screen S is placed at a predetermined distance in parallel with an entrance boundary surface of the semi-cylindrical rod lens MR. Incoming light L1 by a laser parallel beam is incident on the entrance boundary surface 10 in parallel with the optical axis Z, and outgoing light L2 refracted on an exit surface 20 draws a straight line on the screen S.

The incoming light L1 is incident at an incidence angle θ1 with respect to a normal line P to the exit surface, and becomes the outgoing light L2 as a result of being refracted at a refraction angle θ2. The incidence angle θ1 of the incoming light L1 is small near the optical axis Z, and increases as the incoming light L1 becomes away from the optical axis Z and a distance X between the optical axis Z and the incoming light L1 approaches the radius R. This being so, the refraction angle θ2 of the incoming light L1 incident near the optical axis Z is small, and the outgoing light L2 draws a bright straight line without much dispersion. However, as the incoming light L1 becomes away from the optical axis Z and the distance X increases, the incidence angle θ1 rapidly increases, and the refraction angle θ2 increases too, so that the incoming light L1 is greatly refracted. This causes large dispersion of the outgoing light L2, and the interval between adjacent outgoing light beams widens and an outgoing light density drops. As a result, a dark straight line is drawn.

FIG. 11 is a luminance characteristics chart showing a relation between straight line brightness and a deflection angle (W=θ2−θ1) formed by the outgoing light with the optical axis. In a deflection angle curve D, the deflection angle W rapidly increases as the incoming light L1 becomes away from the optical axis Z and the distance X between the incoming light L1 and the optical axis Z approaches the distance of the radius R. The curve stops at the point of the deflection angle W where total reflection occurs. A luminance curve B varies in accordance with this deflection angle curve D, in such a manner that the luminance is highest when the incoming light L1 is on the optical axis Z and decreases as the distance X approaches the distance of the radius R. FIG. 12 is a straight line drawing schematic view schematically showing straight line drawing. The incoming light L1 enters the semi-cylindrical lens MR, and the outgoing light L2 greatly disperses at the both ends and decreases in light quantity, so that a straight line with the both end portions darker than the central portion is generated. Japanese Patent Application Laid-Open No. 2003-329454 describes a mechanism of automatically correcting vertical and horizontal line light emission positions of a laser marker that includes a laser light source, a collimating lens, and a cylindrical lens.

SUMMARY OF THE INVENTION

The present invention was conceived to solve the problem mentioned above, and has an object of providing a laser line-generator that generates a straight line with the both end portions as bright as the central portion, and a laser line-generator module that integrates the laser line-generator with a laser light source.

A laser line-generator of the present invention is a laser line-generator using a columnar transparent medium. The columnar transparent medium has an entrance boundary surface for taking in laser light and an exit surface for emitting the taken laser light linearly, wherein at least one of the entrance boundary surface and the exit surface is composed of a curved surface, and a curve forming the curved surface includes two or more inflection points.

A laser line-generator of the present invention is a laser line-generator using a columnar transparent medium. The columnar transparent medium has an entrance boundary surface for taking in laser light and an exit surface for emitting the taken laser light linearly, wherein at least one of the entrance boundary surface and the exit surface is composed of a curved surface, and a curve forming the curved surface includes two or more inflection points. The inflection points exist neither on the entrance boundary surface nor the exit surface but outside of the extension of the entrance boundary surface and the exit surface.

A laser module of the present invention is formed by directly incorporating a laser line-generator and a semiconductor laser onto an enclosure or a case of the semiconductor laser, and emits laser lightlinearly.

According to the present invention, a laser line-generator that generates a straight line with the both end portions as bright as the central portion can be obtained. By integrating this laser line-generator with a laser light source to form a laser line-generator module and incorporating the laser line-generator module into a laser marker, a decrease in workability can be prevented even when a long reference line is needed. This enables a laser marker with improved workability to be provided.

BRIEF DESCRIPTION OF THE DRAWINGS

FIG. 11 is a luminance characteristics chart of a straight line corresponding to a deflection angle of the semi-cylindrical rod lens.

FIG. 12 is a straight line drawing schematic view schematically showing straight line drawing by the semi-cylindrical rod lens.

DESCRIPTION OF THE PREFERRED EMBODIMENTS

Figure 1:
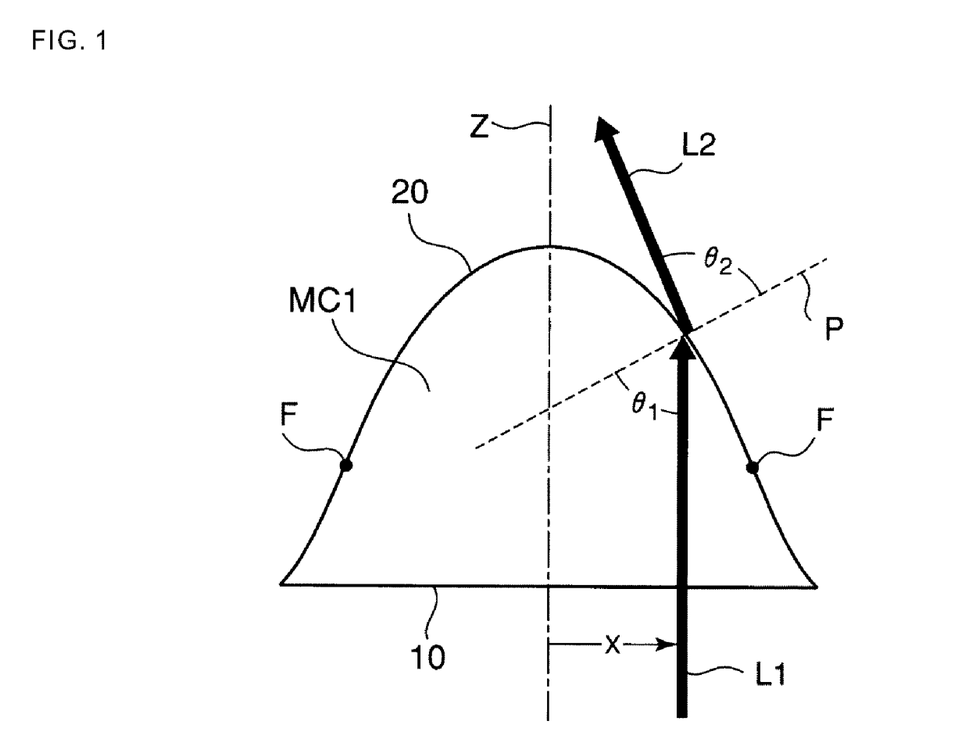
FIG. 1 is an outline view showing a form of the first embodiment of a laser line-generator of the present invention.
Figure 2:
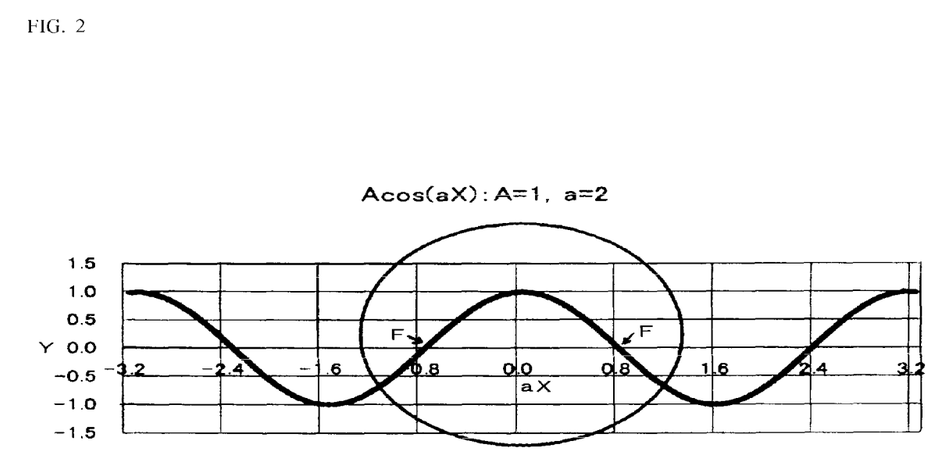
FIG. 2 is a cosine function curve diagram showing a cosine function.

Embodiments of a laser line-generator according to the present invention are described below, with reference to drawings. FIG. 1 is a laser line-generator outline view showing a form of a laser line-generator according to the first embodiment of the present invention. FIG. 2 is a cosine function curve diagram showing a cosine function. This cosine function curve represents the case of a cosine function $Y=A \cos(aX)$ where $A=1$ mm and $a=2$ mm$^{-1}$. In FIG. 1, a segment indicated by a circle shown in FIG. 2 is cut out for a laser line-generator MC1. An entrance boundary surface 10 is a flat surface, whereas an exit surface 20 has the cut cosine function curve and includes inflection points F on both sides of an optical axis Z. Laser incoming light L1 is incident on the entrance boundary surface 10 in parallel with the optical axis Z, and forms an incidence angle θ1 with respect to a normal line P. The incoming light L1 refracts at the exit surface 20, and outgoing light L2 is emitted at a refraction angle θ2 with respect to the normal line P.

Figure 3:
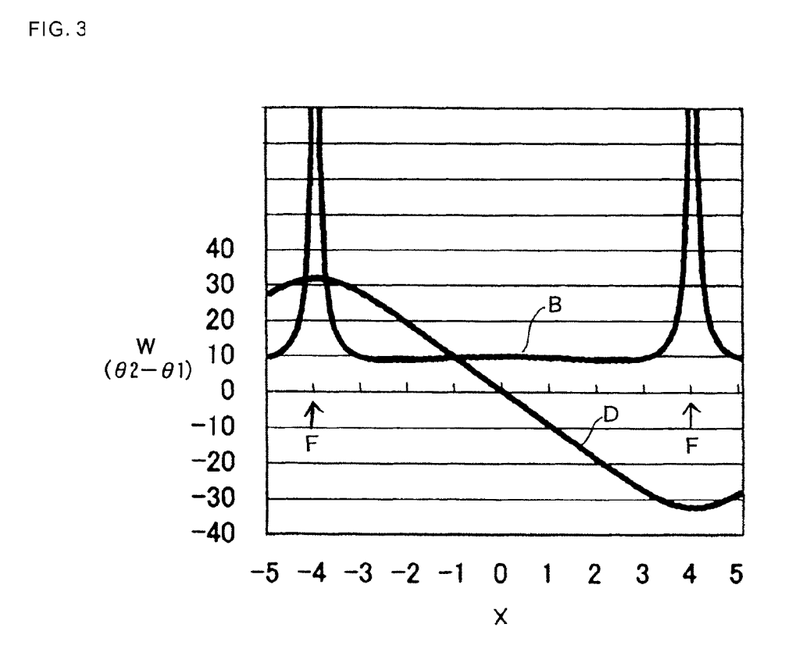
FIG. 3 is a luminance characteristics chart of a straight line corresponding to a deflection angle of the laser line-generator according to the first embodiment.
Figure 4:
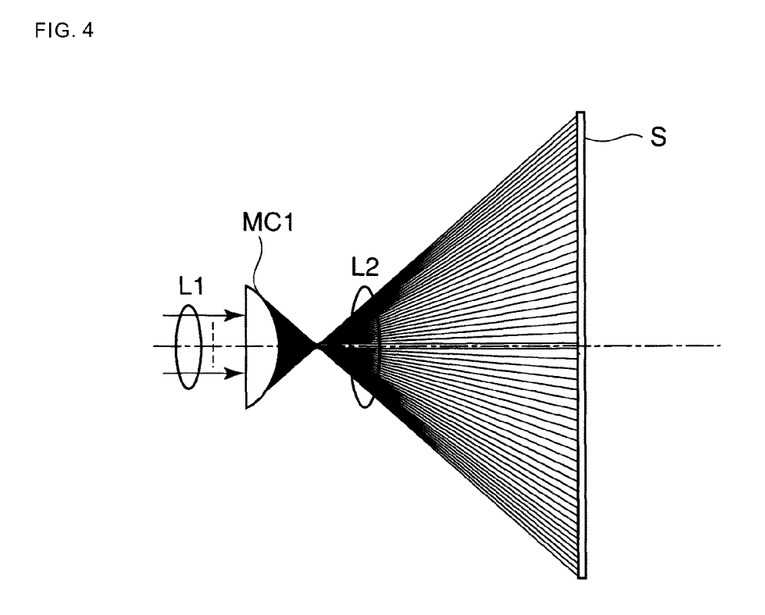
FIG. 4 is a schematic view of straight line drawing by the laser line-generator of the first embodiment.

FIG. 3 is a luminance characteristics chart showing a relation between straight line brightness and a deflection angle W of the laser line-generator of the first embodiment. In a deflection angle curve D shown in FIG. 3, the refraction angle θ2 varies monotonically as the incoming light L1 on the entrance surface becomes away from the optical axis Z and the distance X between the incoming light L1 and the optical axis Z increases, reduces its variation near the inflection points F, and exhibits extreme values at the inflection points F. In accordance with this, in the luminance curve B, the luminance is constant in a section where the variation of the refraction angle θ2 is uniform, increases near the inflection points due to the reduced variation of the refraction angle θ2, and is at the maximum at the inflection points. FIG. 4 is a straight line drawing schematic view schematically showing straight line drawing by the laser line-generator of the first embodiment. The incoming light L1 is incident on the flat entrance boundary surface, and the outgoing light L2 exits from the exit surface having the cosine function curve and draws a straight line on a screen S. The brightness is constant up to near the both end portions of the straight line, increases at the both end portions of the straight line since the dispersion of the outgoing light L2 is reduced, and reaches a peak at the both ends.

Figure 5:
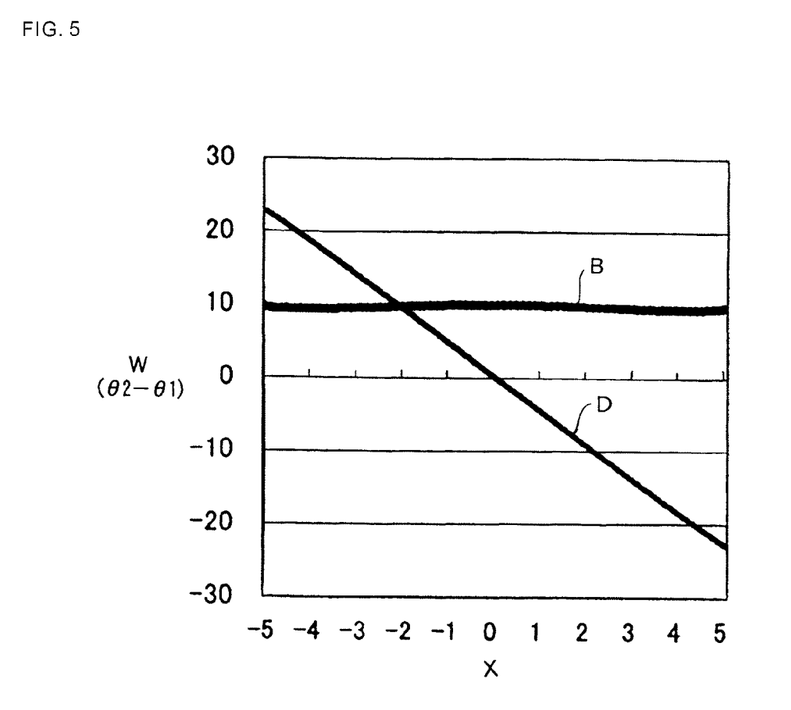
FIG. 5 is a luminance characteristics chart of a straight line corresponding to a deflection angle of the laser line-generator according to the second embodiment.
Figure 6:
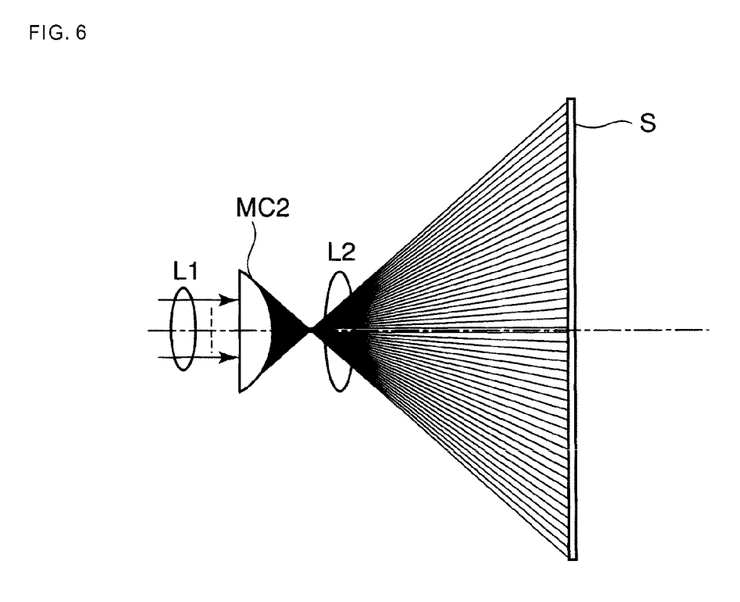
FIG. 6 is a schematic view of straight line drawing by the laser line-generator of the second embodiment.

FIG. 5 is a luminance characteristics chart showing a relation between straight line brightness and a refraction angle of a form of a laser line-generator according to the second embodiment of the present invention. An exit surface (not illustrated) formed by a cosine function curve in the second embodiment has a cosine function $Y=A \cos(aX)$ where $A=3.5$ mm and $a=0.2$ mm$^{-1}$, and a segment cut out by a circle in FIG. 2 does not contain the inflection points F on both sides of the optical axis Z. Accordingly, FIG. 5 corresponds to a part of the deflection angle curve D and the luminance curve B between the inflection points on both sides shown in FIG. 3. The deflection angle curve D is a downward-sloping straight line indicating a monotonic variation of the deflection angle W, and the luminance curve B is a straight line indicating constant luminance. FIG. 6 is a straight line drawing schematic view schematically showing straight line drawing by the laser line-generator of the second embodiment. The incoming light L1 is incident on the flat entrance surface of a laser line-generator MC2, and the outgoing light L2 exits from the exit surface having the cosine function curve between the inflection points and draws a straight line on the screen S. Because the variation of the deflection angle W is uniform, the outgoing light L2 disperses evenly, and the brightness is constant to the both ends of the straight line.

FIG. 5 is a luminance characteristics chart showing a relation between straight line brightness and a refraction angle of a form of a laser line-generator according to the second embodiment of the present invention. An exit surface (not illustrated) formed by a cosine function curve in the second embodiment has a cosine function $Y=A \cos(aX)$ where $A=3.5$ mm and $a=0.2$ mm$^{-1}$, and a segment cut out by a circle in FIG. 2 does not contain the inflection points F on both sides of the optical axis Z. Accordingly, FIG. 5 corresponds to a part of the deflection angle curve D and the luminance curve B between the inflection points on both sides shown in FIG. 3. The deflection angle curve D is a downward-sloping straight line indicating a monotonic variation of the deflection angle W, and the luminance curve B is a straight line indicating constant luminance. FIG. 6 is a straight line drawing schematic view schematically showing straight line drawing by the laser line-generator of the second embodiment. The incoming light L1 is incident on the flat entrance surface of a laser line-generator MC2, and the outgoing light L2 exits from the exit surface having the cosine function curve between the inflection points and draws a straight line on the screen S. Because the variation of the deflection angle W is uniform, the outgoing light L2 disperses evenly, and the brightness is constant to the both ends of the straight line.

Figure 7:
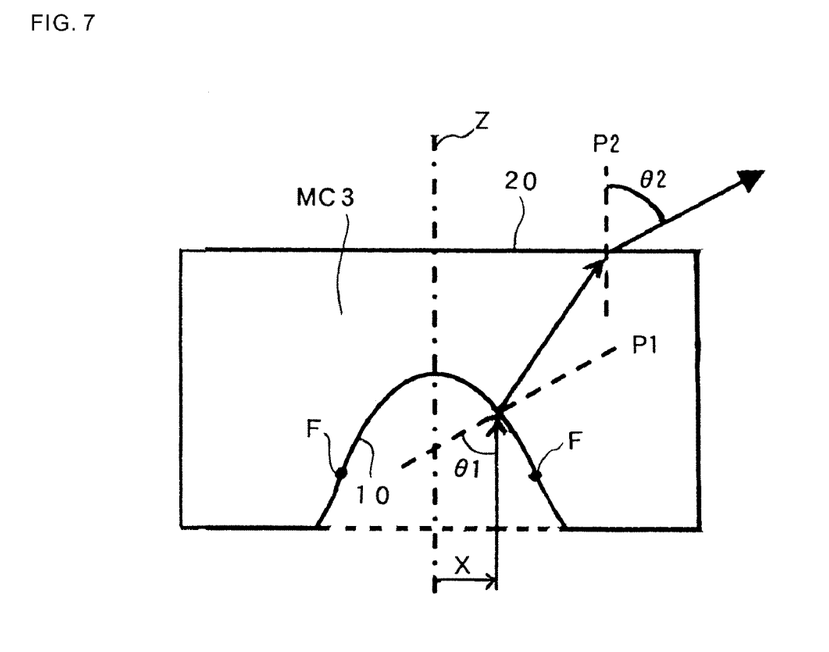
FIG. 7 is an outline view showing a form of the third embodiment of a laser line-generator of the present invention.

FIG. 7 is a laser line-generator outline view showing a form of a laser line-generator according to the third embodiment of the present invention. A cosine function curve in the third embodiment represents a cosine function $Y=A \cos(aX)$ where $A=8.9$ mm and $a=0.393$ mm$^{-1}$. The segment cut out by the circle shown in FIG. 2 is applied to the entrance boundary surface 10 which has the inflection points F on both sides of the optical axis Z, whereas the exit surface 20 is a flat surface. The laser incoming light L1 is incident on the entrance boundary surface 10 in parallel with the optical axis Z, and forms the incidence angle θ1 with respect to a normal line P1. The incoming light L1 refracts at the exit surface 20, and outgoing light L2 is emitted at the refraction angle θ2 with respect to a normal line P2.

Figure 8:
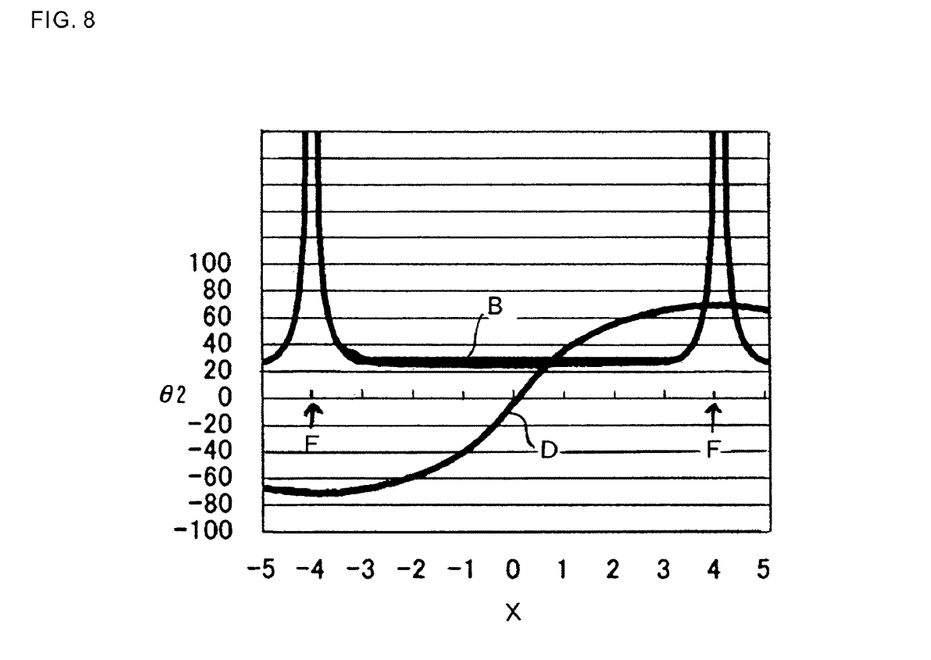
FIG. 8 is a luminance characteristics chart of a straight line corresponding to a deflection angle of the laser line-generator according to the third embodiment.
Figure 9:
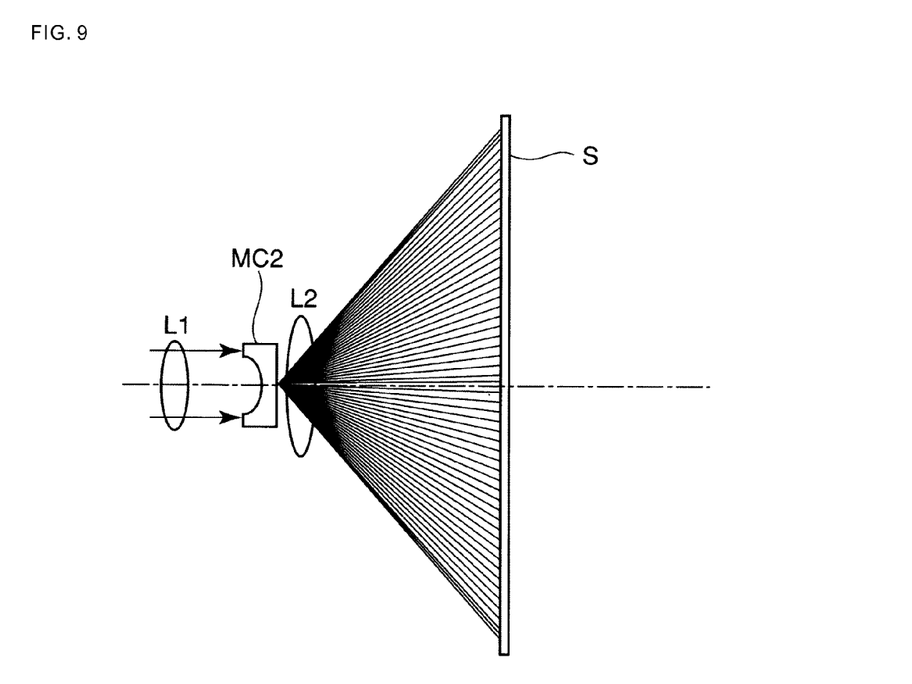
FIG. 9 is a schematic view of straight line drawing by the laser line-generator of the third embodiment.

FIG. 8 is a luminance characteristic chart showing a relation between straight line brightness and a refraction angle of the laser line-generator of the third embodiment. In the refraction angle curve D shown in FIG. 8, the refraction angle θ2 gradually decreases as the incoming light L1 on the entrance boundary surface becomes away from the optical axis Z and the distance X between the incoming light L1 and the optical axis Z increases, and exhibits extreme values at the inflection points F. In accordance with this, in the luminance curve B, the luminance slightly increases as the refraction angle θ2 gradually decreases, and is at the maximum at the inflection points. FIG. 9 is a straight line drawing schematic view schematically showing straight line drawing by the laser line-generator of the third embodiment. The incoming light L1 is incident on the concave entrance boundary surface, and the outgoing light L2 exits from the flat exit surface and draws a straight line on the screen S. The dispersion of the outgoing light L2 gradually decreases and so the brightness gradually increases up to near the both end portions of the straight line, and the outgoing light L2 has no dispersion and the brightness reaches a peak at the both ends of the straight line.

The first to third embodiments describe the case where the entrance boundary surface is a flat surface and the exit surface is a cosine function curved surface having two inflection points, the case where the entrance boundary surface is a flat surface and the exit surface is a cosine function curved surface whose two inflection points exist not on the exit surface but outside of the extension of the exit surface, and the case where the entrance surface is a cosine function curved surface having two inflection points and the exit surface is a flat surface. These entrance boundary surfaces and/or exit surfaces may have a curved surface formed by a curve of a cosine function and the like where the curve forming the curved surface includes two or more inflection points or where the two or more inflection points exist not on the entrance boundary surface or the exit surface but outside of the extension of the entrance boundary surface or the exit surface. Furthermore, the laser line-generator according to the present invention and a semiconductor laser may be directly incorporated onto an enclosure or a case of the semiconductor laser to form a laser line-generator module (not illustrated) that emits laser light linearly.

As described above, according to the present invention, a laser line-generator that generates a straight line with the both end portions as bright as the central portion can be obtained. By integrating this laser line-generator with a laser light source to form a laser line-generator module and incorporating the laser line-generator module into a laser marker, a decrease in workability can be prevented even when a long reference line is needed. This enables a laser marker with improved workability to be provided.

What is claimed is:

1. A laser line-generator using a columnar transparent medium, the columnar transparent medium having an entrance boundary surface for taking in laser light and an exit surface for emitting the taken laser light linearly in a straight line beam,
    wherein at least one of the entrance boundary surface and the exit surface is composed of a curved surface, and a curve forming the curved surface includes two or more inflection points on the at least one of the entrance boundary surface and the exit surface, and
    wherein the laser light emitted linearly has an orthogonal relation to an optical axis and a column height direction of the columnar transparent medium and has an illuminance distribution that is at least as bright on opposed end portions of the straight line beam as in a central portion of the straight line beam.

2. A laser line-generator using a columnar transparent medium, the columnar transparent medium having an entrance boundary surface for taking in laser light and an exit surface for emitting the taken laser light linearly in a straight line beam,
    wherein at least one of the entrance boundary surface and the exit surface is composed of a curved surface, and a curve forming the curved surface includes two or more inflection points that exist not on the at least one of the entrance boundary surface and the exit surface but on the curve outside the at least one of the entrance boundary surface and the exit surface, and
    wherein the laser light emitted linearly has an orthogonal relation to an optical axis and a column height direction of the columnar transparent medium and has an illuminance distribution that is at least as bright on opposed end portions of the straight line beam as in a central portion of the straight line beam.

3. A laser line-generator module that is formed by directly incorporating the laser line-generator as claimed in claim 1 and a semiconductor laser onto an enclosure or a case of the semiconductor laser, and emits laser light linearly.

4. A laser line-generator module that is formed by directly incorporating the laser line-generator as claimed in claim 2 and a semiconductor laser onto an enclosure or a case of the semiconductor laser, and emits laser light linearly.

5. The laser line-generator as claimed in claim 1, wherein the illuminance distribution has peak values in the end portions.

6. The laser line-generator as claimed in claim 1, wherein the laser light emitted linearly has an deflection angle from the optical axis that varies continuously for respective distances of the taken in laser light away from the optical axis.

7. The laser line-generator as claimed in claim 6, wherein the deflection angle varies monotonically for the respective distances.

8. The laser line-generator as claimed in claim 1, wherein the laser light incident on the curved surface is parallel to the optical axis.

9. The laser line-generator as claimed in claim 1, wherein the curved surface follows a cosine function of a distance away from the optical axis.

10. The laser line-generator as claimed in claim 2, wherein the illuminance distribution has peak values in the end portions.

11. The laser line-generator module as claimed in claim 2 wherein the laser light emitted linearly has an deflection angle from the optical axis that varies continuously for respective distances of the taken in laser light away from the optical axis.

12. The laser line-generator as claimed in claim 11, wherein the deflection angle varies monotonically for the respective distances.

13. The laser line-generator as claimed in claim 2, wherein the laser light incident on the curved surface propagates parallel to the optical axis.

14. The laser line-generator as claimed in claim 2, wherein the curved surface follows a cosine function of a distance away from the optical axis.

15. A laser line-generator, comprising:
    a transparent medium columnar in a first direction transverse to an optical axis and having an entrance boundary surface receiving laser light propagating parallel to the optical axis and an exit surface emitting the laser light to form a straight line beam extending along a second direction transverse to the first direction and to the optical axis,
    wherein at least one of the entrance boundary surface and the exit surface is composed of a curved surface following a curve including two or more inflection points and the curved surface cause the straight line beam to have an illuminance distriburtion that is at least as bright on opposed end portions of the straight line beam as in a central portion thereof.

16. The laser line-generator of claim 15, wherein the laser light propagates through at least two of the inflection points.

17. The laser line-generator of claim 15, wherein the laser light does not propagate through any of the inflection points.

* * * * *